United States Patent [19]
Swis et al.

[11] 3,834,221
[45] Sept. 10, 1974

[54] TEST STAND FOR VEHICLE ENGINES

[75] Inventors: Philip E. Swis, Mt. Clemens; Russell Labeau, Southfield; Glenn M. Brown, Royal Oak, all of Mich.

[73] Assignee: The Cross Company, Fraser, Mich.

[22] Filed: May 23, 1973

[21] Appl. No.: 363,054

[52] U.S. Cl. .................................. 73/116, 73/459
[51] Int. Cl. ........................................ G01m 15/00
[58] Field of Search ............ 73/116, 462, 465, 466, 73/460, 459; 198/40, 131

[56] References Cited
UNITED STATES PATENTS

| | | | |
|---|---|---|---|
| 2,334,991 | 11/1943 | Castiglia | 73/459 X |
| 3,443,440 | 5/1969 | Porter | 73/462 |
| 3,527,087 | 9/1970 | Converse et al. | 73/117.3 |
| 3,616,686 | 11/1971 | Lash | 73/116 |

Primary Examiner—Jerry W. Myracle
Attorney, Agent, or Firm—Harness, Dickey & Pierce

[57] ABSTRACT

A cradle of inverted U shape is suspended from a frame and rockable on vertical and horizontal axes. With the cradle locked to the frame an engine to be tested is placed within the cradle and rigidly locked thereto at an exact predetermined location. The crankshaft is rotated by drive means so constructed as to add minimum dynamic unbalance to the engine. The cradle is unlocked from the frame and the dynamic unbalance of the engine is measured by seismic transducers engaging the engine or directly attached to the cradle.

25 Claims, 15 Drawing Figures

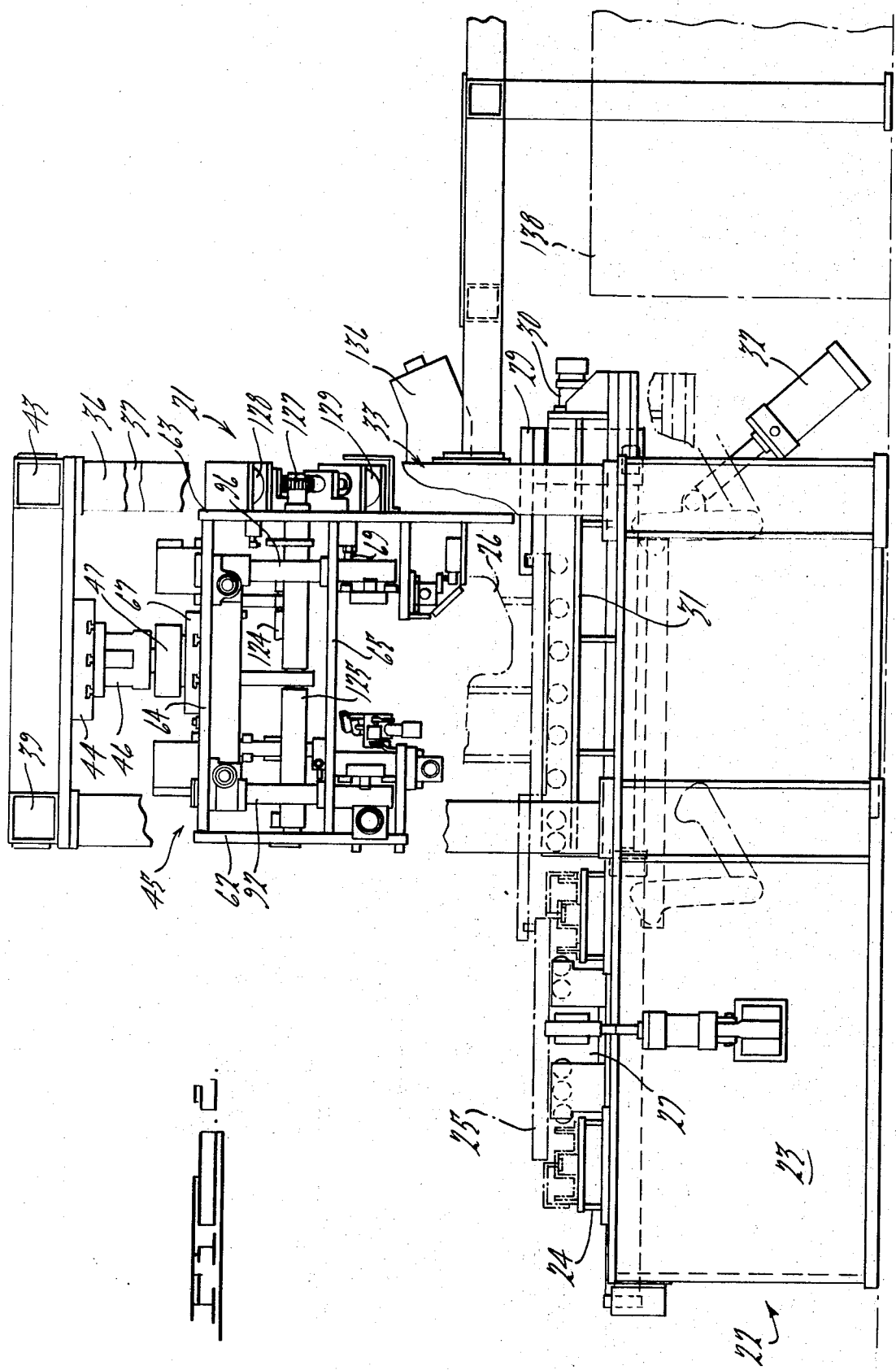

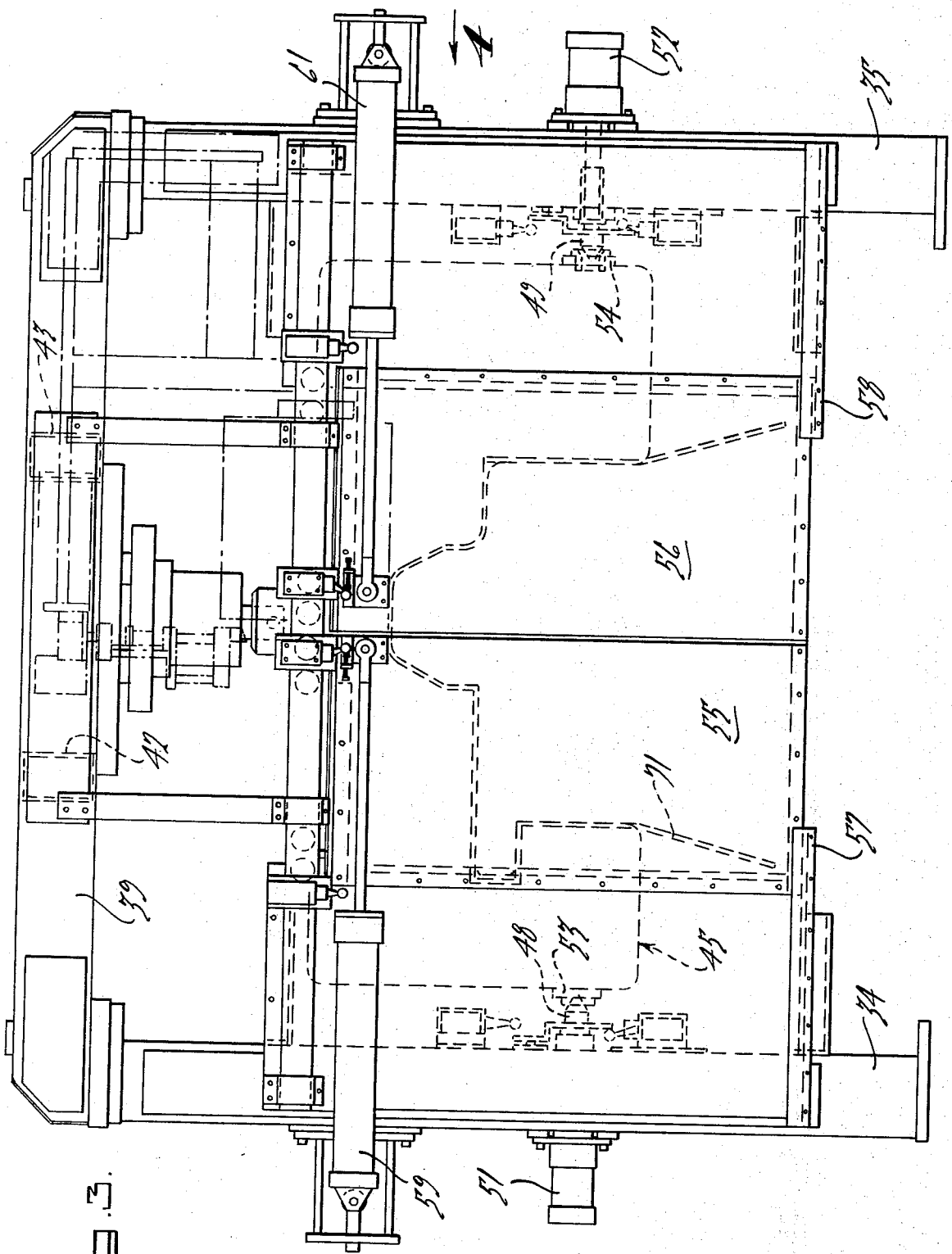

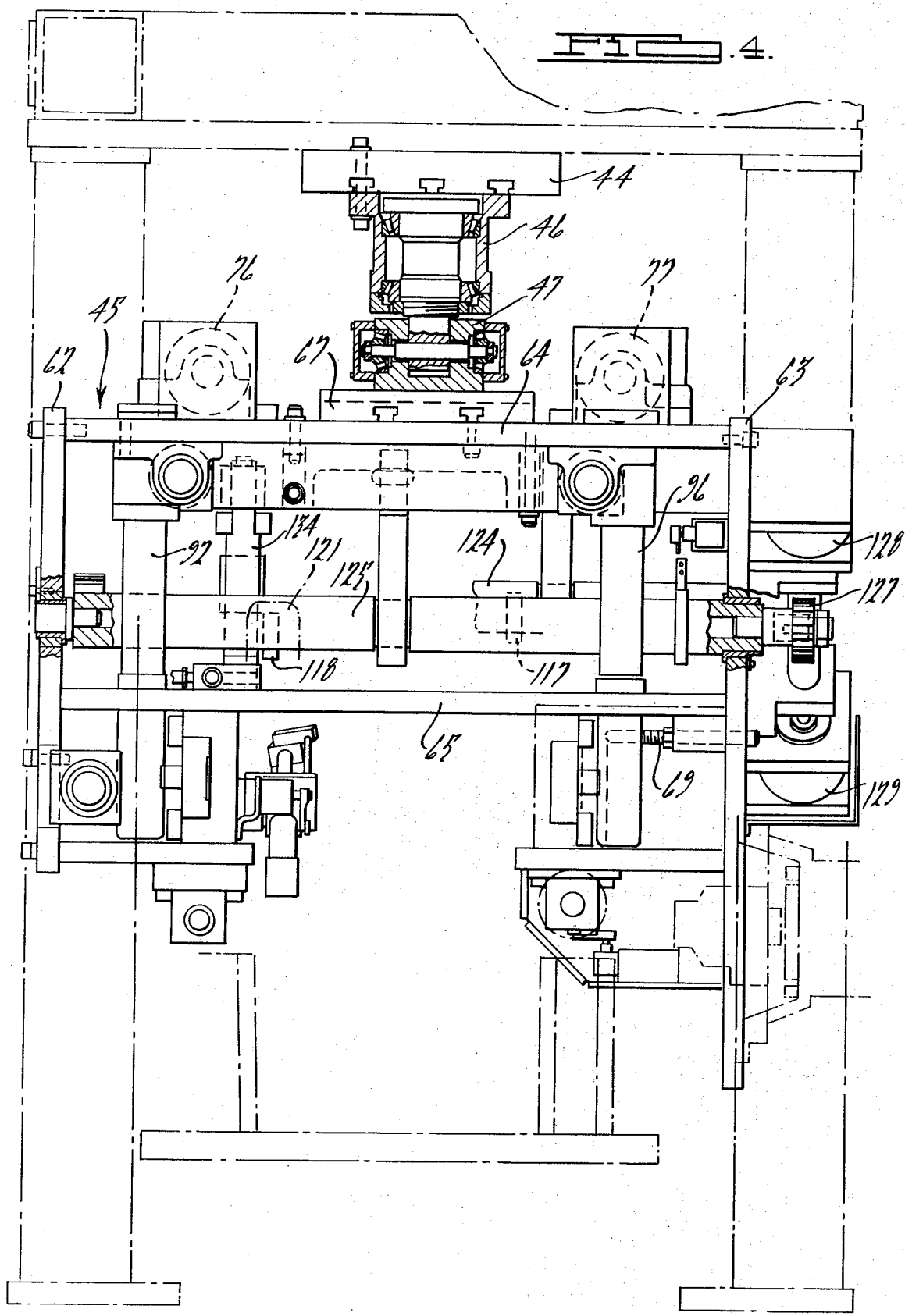

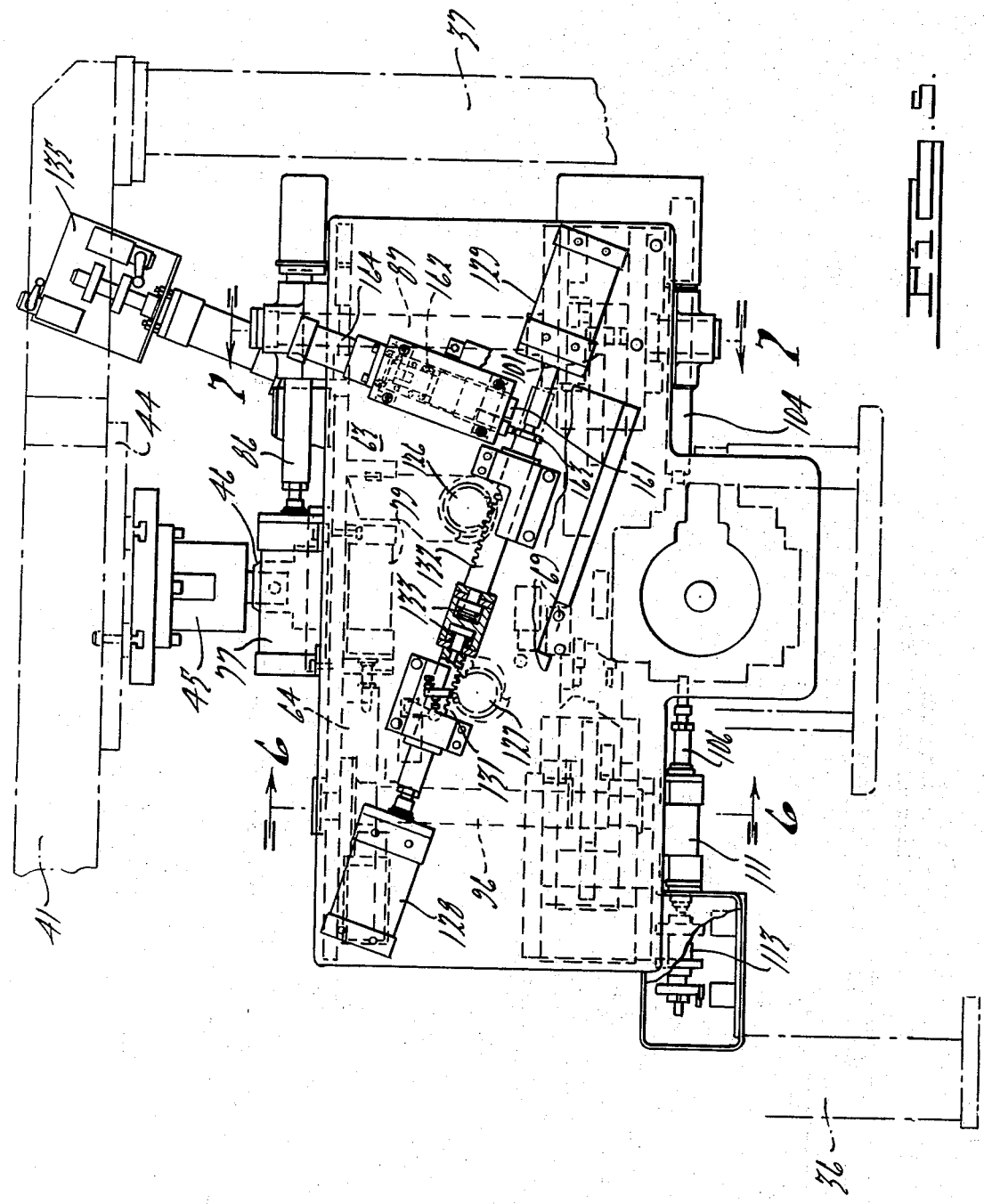

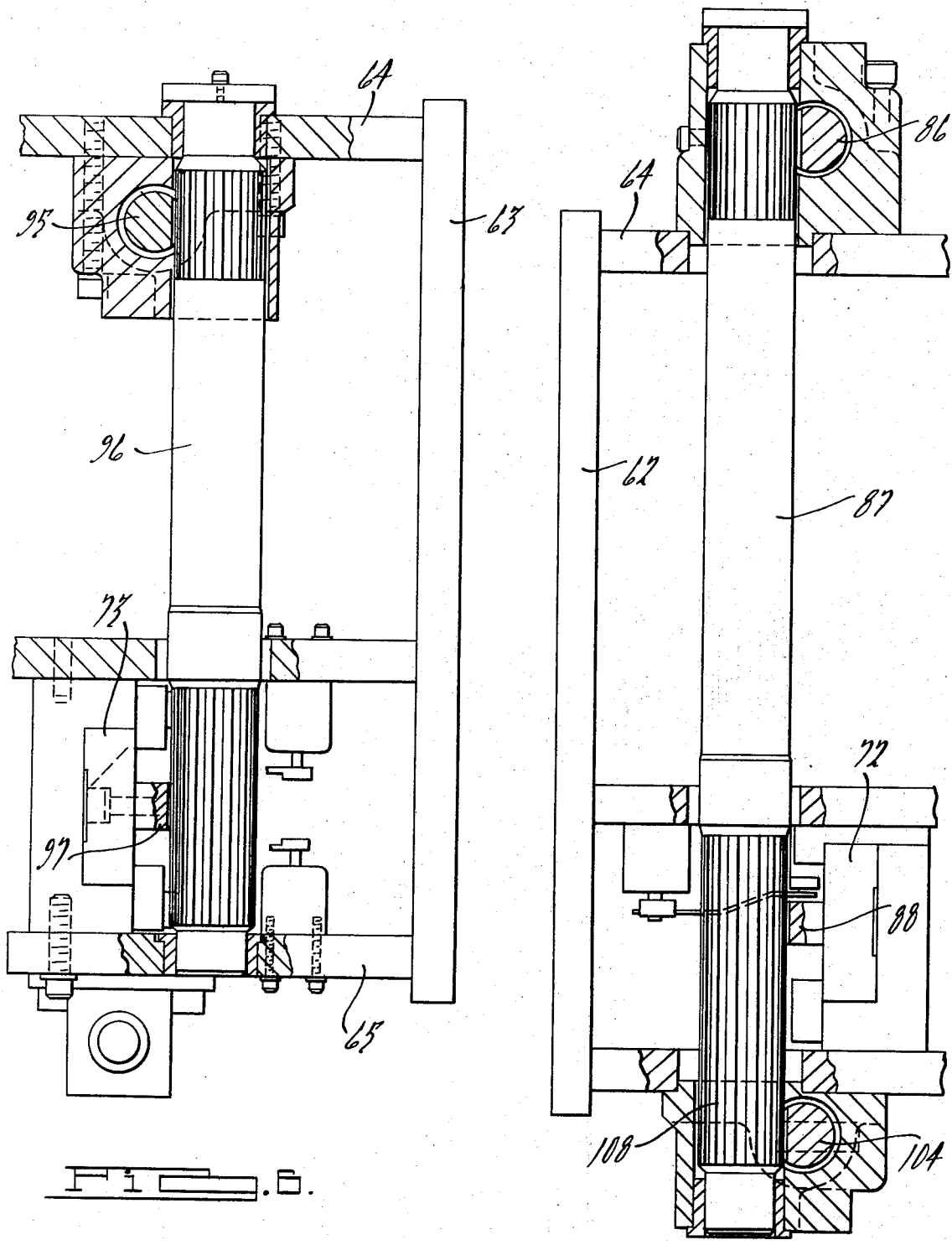

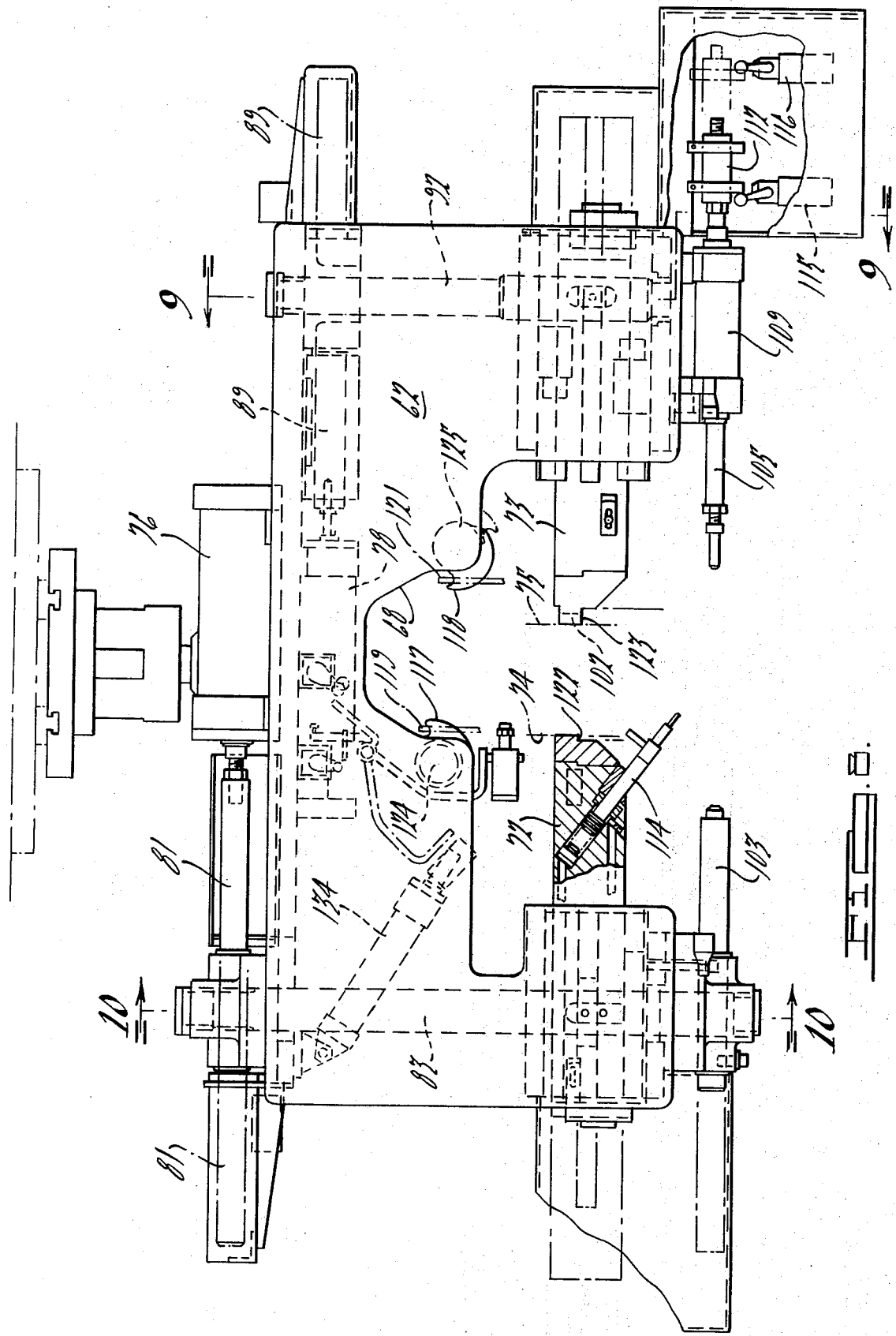

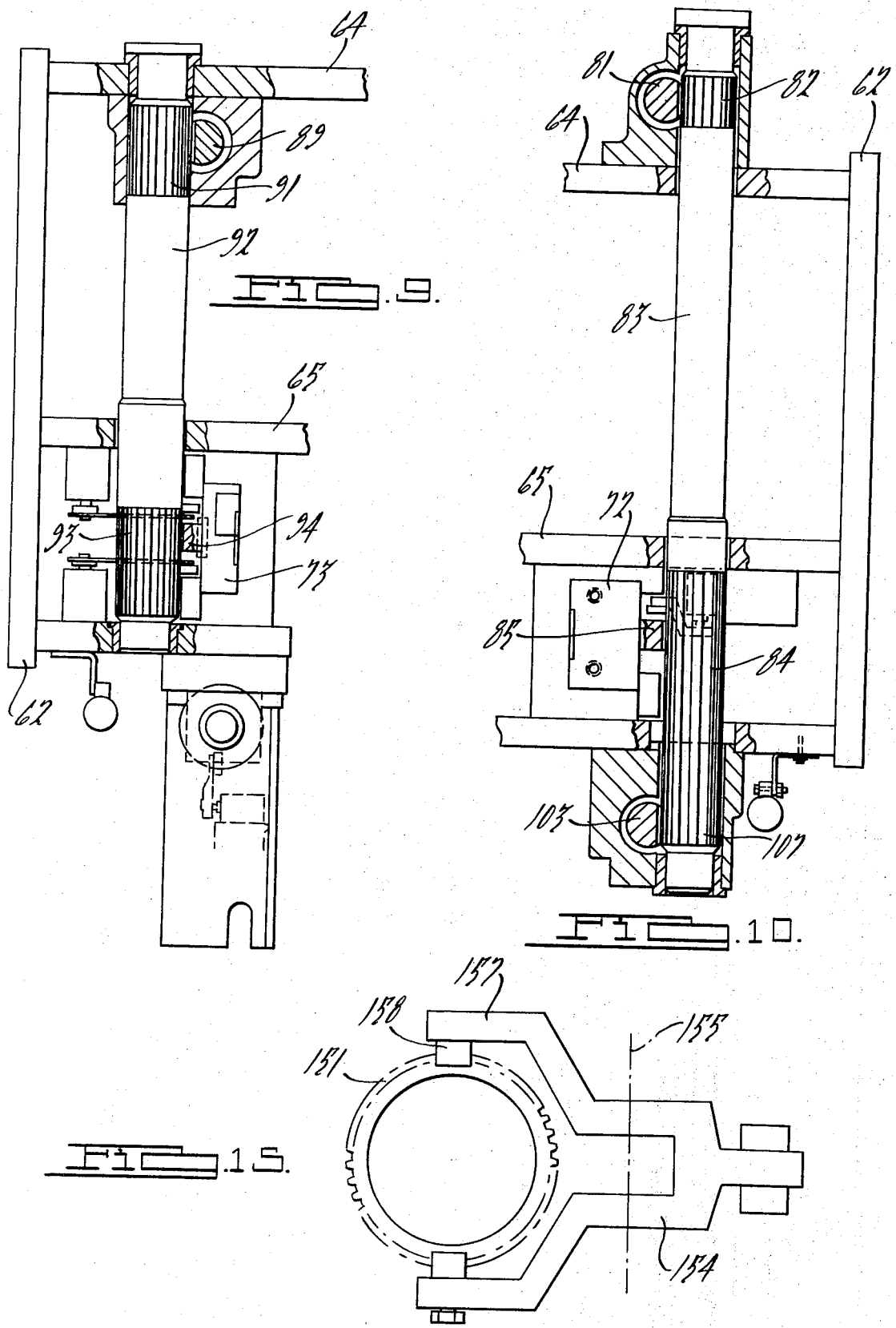

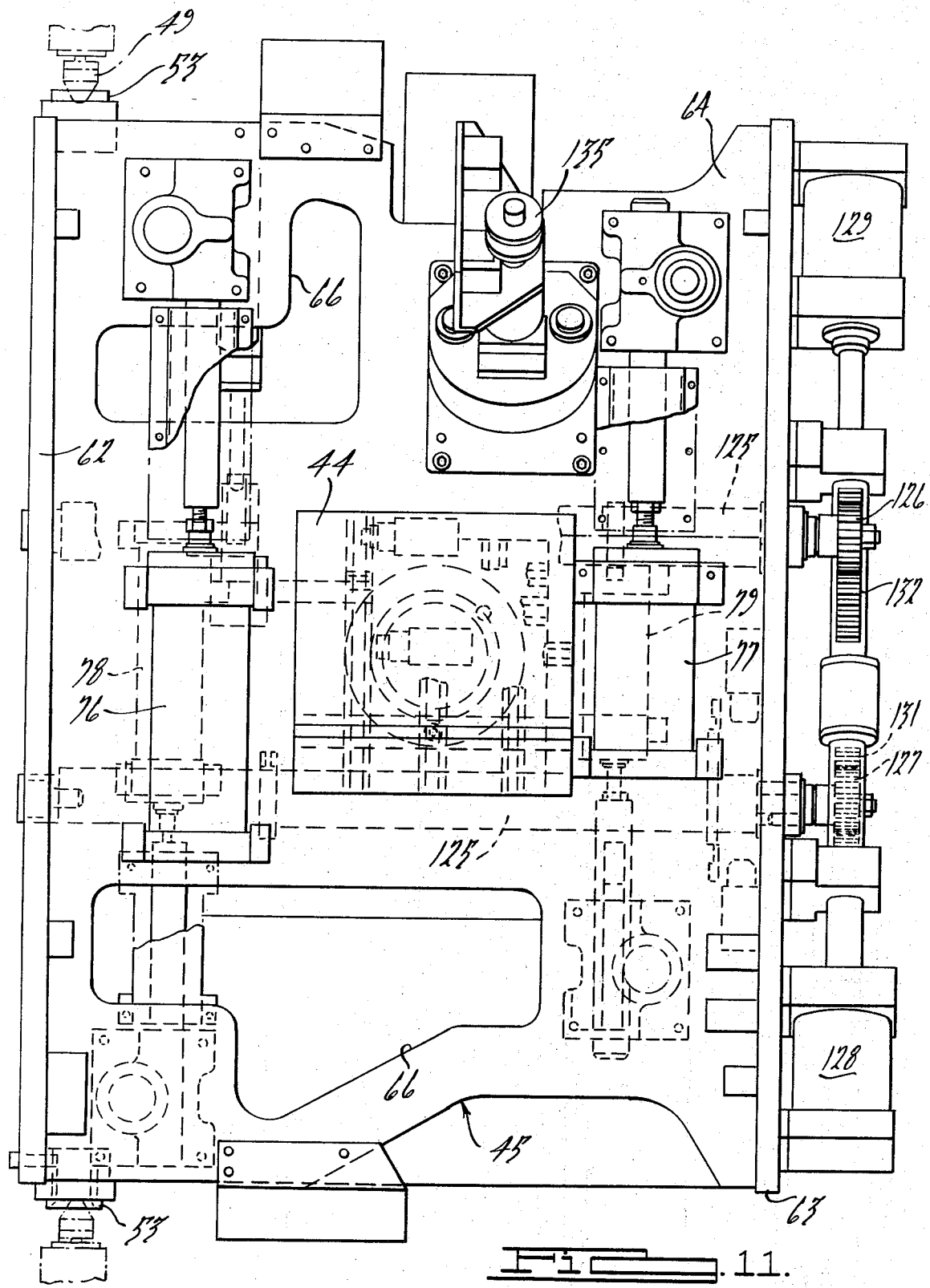

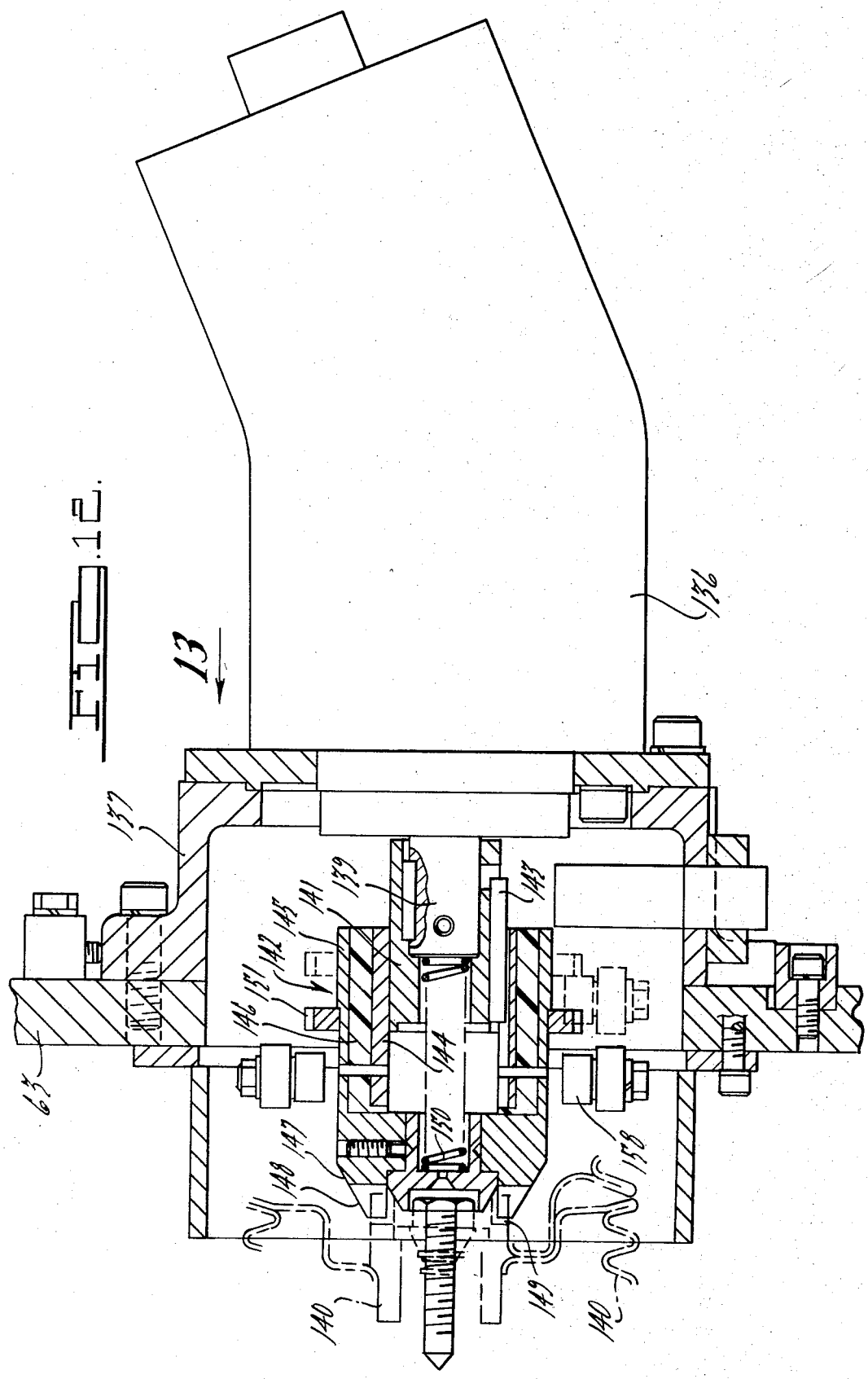

TEST STAND FOR VEHICLE ENGINES

BACKGROUND OF THE INVENTION

1. Field of the Invention

The invention relates to engine testing, and more particularly to test stands in which an automotive vehicle engine is driven either under its own power or by an external power source to measure or adjust various functional characteristics such as ignition timing, oil pressure and dynamic unbalance. The invention is particularly concerned with dynamic unbalance measuring.

DESCRIPTION OF THE PRIOR ART

It is known to test vehicle engines with dynamic unbalance by rigidly mounting the engine in a test stand and running it while vibration pickup means measures the dynamic unbalance. However, such systems have important disadvantages as compared with the present invention, particularly in terms of the unrepeatability of test results and lack of sufficient consistency.

A preliminary search on the subject matter of this invention revealed the following: U.S. Pat. Nos. 3,538,759; 3,505,863; 3,377,849; 3,527,087.

Other patents which have generally to do with engine test stands or conveyor systems of which such test stands are a part are the following:

U.S. Pat. Nos. 3,538,759; 3,552,196; 3,648,819; 3,697,865.

BRIEF SUMMARY OF THE INVENTION

It is an object of the present invention to provide a novel and improved engine test stand which enables vehicle engines to be tested for dynamic unbalance in a rapid yet accurate manner, and which produces repeatable and consistent results.

It is another object to provide an improved test stand of this type which minimizes the ratio of parasitic to engine weight, thus increasing the relative strength and reliability of the signals which indicate the degree of dynamic unbalance.

It is a further object to provide an improved test stand of this character which enables excessive engine noise to be monitored over a full range of speeds.

It is another object to provide a novel test stand of this nature which can be used in both hot and cold testing of engines, that is, to test the various functions of the engine when the engine is driven from an external source as well as when it is self-driven.

It is also an object to provide an improved test stand of this character which greatly reduces the time required for reliable engine testing as compared with previous systems.

It is a further object to provide a novel engine test stand of this type which permits simultaneous sensing of both static and dynamic unbalance.

Briefly, the illustrated embodiment of this invention comprises an open frame in which is movably suspended a cradle of inverted U shape. The engine to be tested is diverted from a conveyor line and enters the cradle which at this time is rigidly locked to the frame. Clamping slides carried by the cradle engage locating surfaces on opposite sides of the engine to secure it accurately in place in directions parallel and transverse to the crankshaft axis. Lift hooks movably mounted on the cradle engage eyes on the engine to elevate it slightly against stops on the clamps so as to accurately locate the engine vertically.

An external drive mechanism is now connected to the crankshaft, the mechanism being so constructed that a major portion is dynamically uncoupled from the engine to minimize its effect on the unbalance sensors. The latter comprise a pair of seismic transducers carried by the cradle and engageable with front and rear portions of the engine at the level of but at right angles to the crankshaft, or rigidly mounted to the cradle at right angles to the engine axis one at the front and one at the rear of the cradle. The transducers are capable of monitoring excessive engine noise levels at various speeds as well as static and dynamic unbalance.

After various connections and tests are made on the engine which are not pertinent to the present invention, the engine is driven at relatively high speed and the cradle is unlocked from the frame. The cradle is suspended from the frame by vertical and horizontal pivots, and the engine unbalance will be measured by the amount and location of the cradle movement about the pivot axes with respect to the top dead center position of the engine. Dynamic unbalance will be measured by yaw of the engine and cradle about the vertical axis while static unbalance will be indicated by vibration and movement about the horizontal axis.

After the measurements have been made, the seismic transducers monitored for noise at high speed, and other tests and adjustments conducted which are not pertinent to the present invention, the cradle will be reclamped to the frame and the engine drive speed reduced. The transducers will be withdrawn if necessary, other sensors and mechanisms disengaged from the engine, the lift hooks lowered, the locking slides withdrawn and the engine returned to the main conveyor line. Its further disposition will of course depend on the test results.

BRIEF DESCRIPTION OF THE DRAWINGS

FIG. 2 is a side elevational view in the direction of the arrow 2 of FIG. 1;

FIG. 3 is a more detailed elevational view of the rearward end of the test stand itself;

FIG. 4 is a side view of the stand taken in the direction of the arrow 4 of FIG. 3, parts being sectioned;

FIG. 5 is an elevational view of the forward end of the test stand, parts being sectioned;

FIG. 6 is a cross-sectional view in elevation taken along the line 6—6 of FIG. 5;

FIG. 7 is a cross-sectional view in elevation taken along the line 7—7 of FIG. 5;

FIG. 8 is an elevational view of the rearward end of the cradle;

FIG. 9 is a cross-sectional view in elevation taken along the line 9—9 of FIG. 8;

FIG. 10 is a cross-sectional view in elevation taken along the line 10—10 of FIG. 8;

FIG. 11 is a plan view of the cradle;

FIG. 12 is a side elevational view of the drive connection to the crankshaft;

FIG. 15 is a detailed view of the forked lever.

DESCRIPTION OF THE PREFERRED EMBODIMENT

Figure 1:
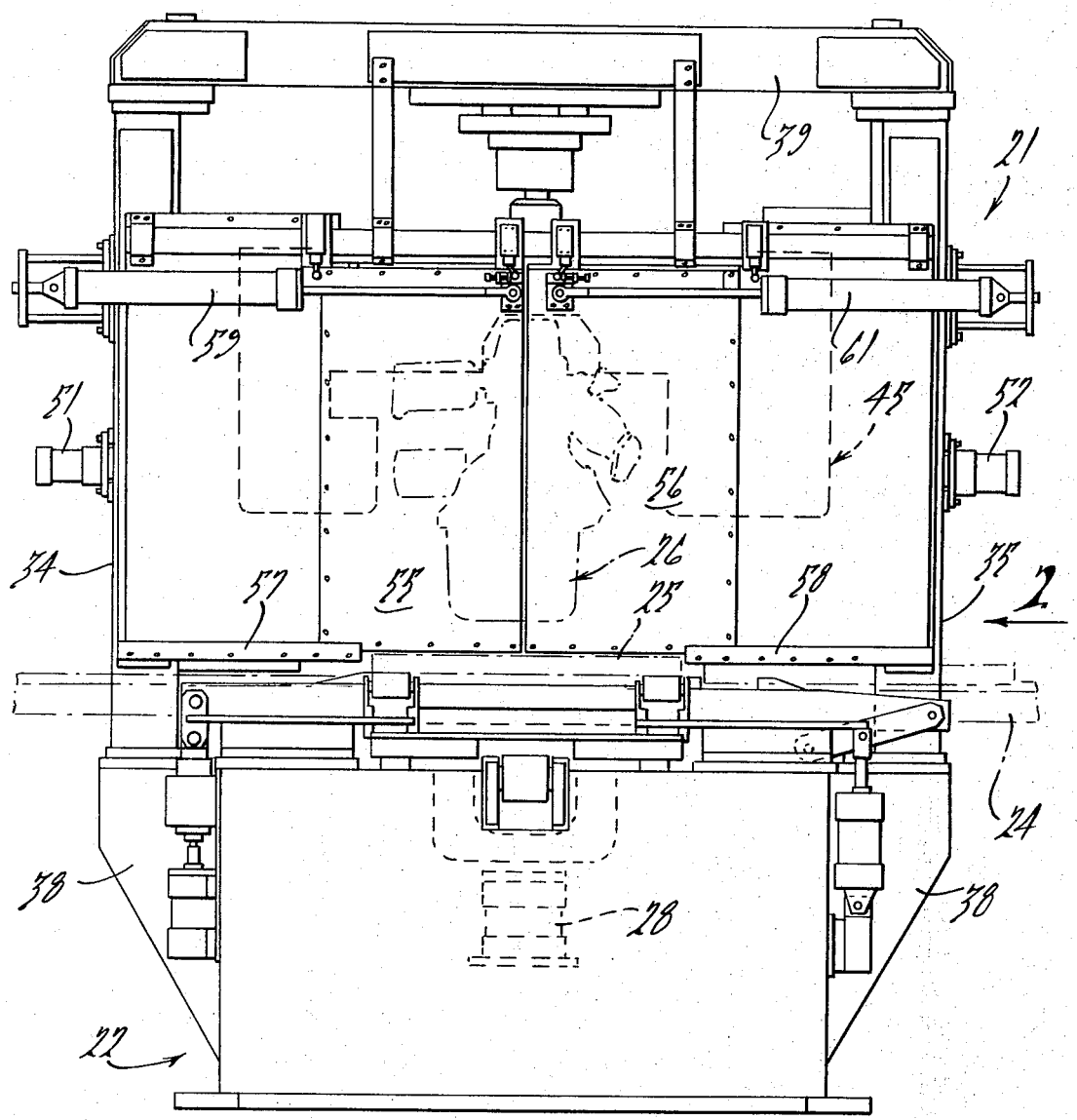
FIG. 1 is an elevational view of the rearward end of the test stand with its associated equipment.
Figure 13:
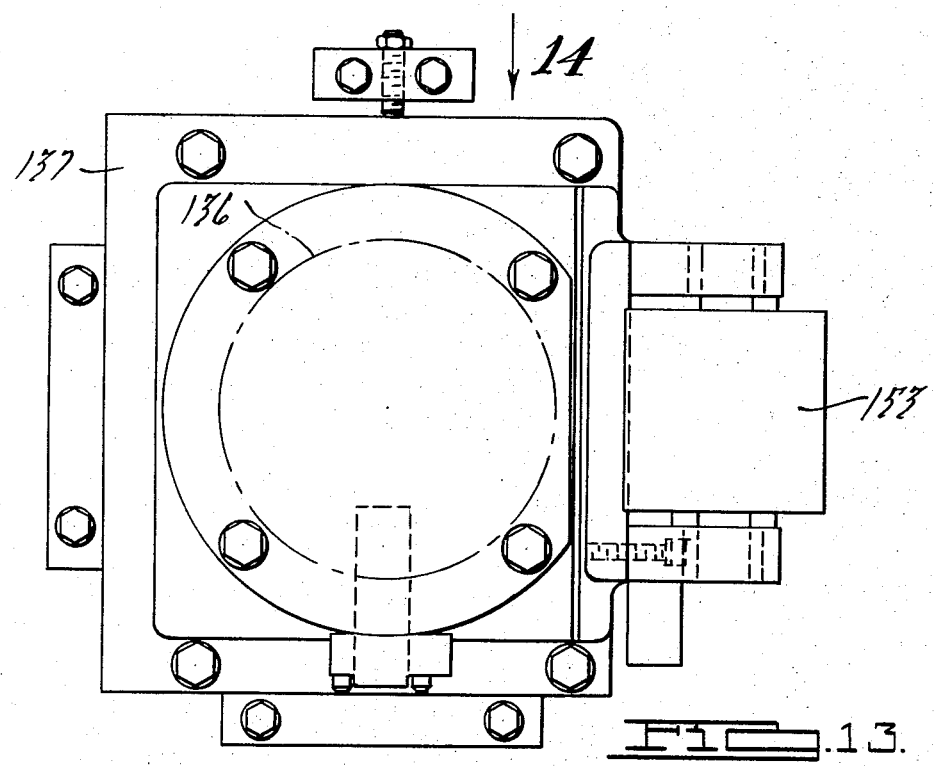
FIG. 13 is an end elevational view thereof taken in the direction 13 of FIG. 12, the motor and other parts being omitted for clarity.
Figure 14:
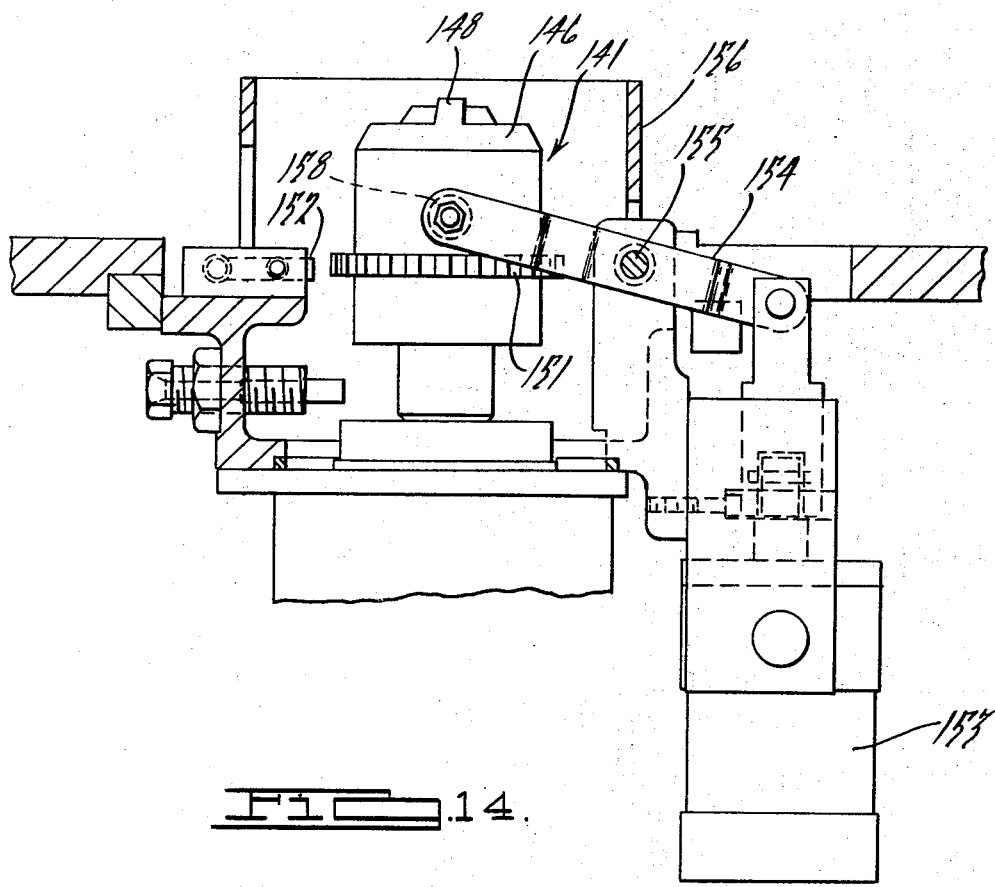
FIG. 14 is a plan view taken in the direction 14 of FIG. 13, parts being sectioned.

The test stand is generally indicated at 21 in FIGS. 1 and 2 and is supported by a base generally indicated at 22. The left hand portion 23 of base 22 in FIG. 2 supports a portion of a conveyor 24 which passes the entrance to test stand 21. The conveyor is adapted to carry pallets 25 on which rest engines generally indicated at 26. Conveyor 24 carries these engines past a plurality of stations one of which has test stand 21.

Means are provided for diverting each engine 26 into test stand 21 as it reaches that station, and returning it to the conveyor after the testing is completed. This means includes a roller-equipped elevator 27 operated by a reciprocable motor 28 which will lift pallet 25 and its engine slightly above the level of conveyor 24, and a horizontally reciprocable pallet diverter 29 operated by a motor 30 which will pull pallet 25 and the engine from elevator 27 into the test stand and later return it to the elevator for replacement on the conveyor. More particularly, an elevator 31 disposed beneath the test stand will receive the pallet when the diverter 29 moves from its left hand to its right hand position in FIG. 2 and will at an appropriate time, described below, descend so that the pallet will be temporarily withdrawn from the engine being tested. Later elevator 31 will be raised so that pallet 25 receives the tested engine, after which diverter 29 will return the engine and pallet to conveyor 24. Elevator 31 is operated by a reciprocable motor 32.

Test stand 21 comprises an open frame generally indicated at 33 having a pair of front posts 34 and 35 and a pair of rear posts 36 and 37 resting on extensions 38 of base 22. A beam 39 rests on posts 34 and 35 and a beam 41 on posts 36 and 37. Cross beams 42 and 43 extend between beams 39 and 41 and support a plate 44 An inverted cradle generally indicated at 45 is suspended from plate 44 by means of an upper bearing assembly 46 and a lower bearing assembly 47. The construction of these assemblies is shown in detail in FIG. 4, bearing assembly 46 permitting the cradle to rock on a vertical axis with respect to the frame while assembly 47 permits rocking on a horizontal axis.

Means are provided for locking the cradle with respect to the frame. This means, best seen in FIGS. 3 and 11, comprises a pair of tapered locking pins 48 and 49 slidably mounted on opposite sides of the frame and movable by reciprocating motors 51 and 52 respectively between retracted and locking positions. In their locking positions pins 48 and 49 engage sockets 53 and 54 respectively carried by cradle 45.

A pair of safety doors 55 and 56 are slidably mounted on frame 33. These doors are seen in FIGS. 1 and 3 and are horizontally slidable on tracks 57 and 58 respectively carried by posts 34 and 35. The doors are operated by reciprocating motors 59 and 61 carried by the frame.

Cradle 45 is of generally inverted U shape to receive engine 26, as seen best in FIG. 1. The exact shape of the interior of the cradle 45 will depend on the shape of the engine being tested, the construction being such that the engine can enter the cradle and be secured and tested in the manner described below. Preferably cradle 45 is constructed of a framework of aluminum plates or similar material which will make the cradle as light as possible while retaining the required structural rigidity and providing support for the various shafts and other operating equipment. For example, as seen in FIG. 4, cradle 45 may comprise a rear plate 62, a forward plate 63, and upper and lower connecting plates 64 and 65. The plates may have lightening holes 66 (FIG. 11) where appropriate, and additional structural members may be provided for supporting the various moving parts. Upper plate 64 is adjustably secured to the underside of lower bearing assembly 47 by a member 67 (FIG. 4).

Rear plate 62 is cut out in an irregular shape as indicated at 68 in FIG. 8 to receive the engine as it is drawn into the cradle by transporting device 29. Forward plate 63 may also be appropriately cut out to accommodate protruding engine parts and carries a stop 69 (FIG. 4) for accurately locating the engine in the direction of its crankshaft axis when the engine is secured in the cradle. A flywheel shield 71 (FIG. 3) is mounted inside the cradle for safety purposes during operation.

The means for locking engine 26 to the cradle is seen in FIGS. 5 and 11 and comprises two opposed pairs of locking slides or clamps 72 and 73. Each pair of clamps is adapted to engage one side of the engine adjacent the front and rear portions thereof, and in particular they engage master reference machine lugs indicated partially in dot-dash lines at 74 and 75 in FIG. 8 which are formed on the engine and used when the block is being machined. The rear clamp 72 is operated by a reciprocable motor 76 and the forward clamp 72 by a motor 77, these motors being mounted above cradle plate 64. Rear clamp 73 is operated by a motor 78 and forward clamp 73 by a motor 79, these motors being mounted beneath plate 64.

The means for connecting motor 76 to its clamp 72 comprises (FIG. 10) a rack 81 operated by the motor and meshing with teeth 82 at the upper end of the vertical shaft 83 rotatably mounted in the cradle. Teeth 84 at the lower end of this shaft mesh with a rack 85 carried by clamp 72. Similarly, motor 77 drives its clamp 72 through a rack 86, a vertical shaft 87, and a rack 88 carried by the clamp (FIG. 7).

The means for connecting motor 78 to its clamp 73 comprises (FIG. 9) a rack 89 connected to motor 78 and meshing with teeth 91 to the upper end of a vertical shaft 92 rotatably mounted in the cradle. The lower portion of this shaft has teeth 93 meshing with a rack 94 carried by clamp 73. Motor 79 similarly operates its clamp 73 by a rack 95 (FIG. 6) driving a vertical shaft 96 which in turn operates a rack 97 carried by the clamp.

Preferably, motors 76, 77, 78 and 79 will be initially actuated under relatively lower pressure to move their respective clamps to clamping position. Clamps 72 will come to rest at fixed reference stops such as that indicated partially at 101 in FIG. 5, and held there under relatively high pressure, while clamps 73 continue to advance under high pressure to securely lock the engine to the cradle. The forward clamp 73 (FIG. 8) has a wedge surface 102 which will engage the engine to force it against front stop 69. The engine will thus be securely locked at an accurate reference position with respect to the cradle in directions both parallel to and at right angles to the crankshaft axis.

Shafts 83 and 87 also operate a pair of auxiliary slides or clamps 103 and 104 respectively, which act to hold the lower portion of the engine in position. Clamps 103 and 104 are aligned with the crankshaft axis and are opposite a pair of vibration sensor shafts 105 and 106 respectively which are slidably mounted below the cradle. The means for actuating clamps 103 and 104 comprise extended portions 107 and 108 of the teeth at the lower ends of shafts 83 and 87 respectively. These teeth mesh with rack teeth on shafts 103 and 104 as seen in FIGS. 7 and 10. As in the case of clamps 72 and 73, clamps 103 and 104 will engage machined reference surfaces on the engine. They will be controlled by reciprocating motors 76 and 77 simultaneously with movements of upper clamps 72. That is, they will be advanced first under relatively low pressure and then under higher pressure, and will be held at fixed reference stops.

Sensing probes 105 and 106 are advanced and retracted by reciprocating motors 109 and 111 respectively and carry at their rearward ends seismic transducers 112 and 113. These transducers, which are conventional in themselves, work on an inertia principle in response to vibration. In practice, the frequency voltage curve associated with the transducer will be calibrated in ounce-inches and the out-of-balance measurement of the engine will depend on the relationship between the ounce-inches measured by the transducers and the angular location of this measurement with respect to the top dead center (TDC) position of the engine flywheel. In a four-cylinder engine, for example, the TDC position relates to the No. 1 cylinder. TDC will be measured during the test by a retractable proximity transducer 114 built into the side clamp 72 (FIG. 8).

Transducer probes 105 and 106 are located as far rearwardly and forwardly of engine 26 as is practicable in order to enable measurement of the dynamic yaw, and are in the plane of and at right angles to the crankshaft centerline. Limit switches 115 and 116 are provided for the advancing and retracting movement of the transducers. In the illustrated embodiment, after each engine 26 is locked in its final testing position with respect to the cradle, by means about to be described, pallet 25 on which the engine rests will be retracted out of the way by lowering of elevator 31, in order to permit probes 105 and 106 to advance into engine-engaging position. While probes 105 and 106 could theoretically engage the cradle instead of the engine, since they are locked together, direct engagement of the engine is preferred.

As an alternative preferred construction (not shown) the probes are eliminated and the transducers secured directly to cradle 45 as far forwardly and rearwardly as practicable so as to be responsive to horizontal vibrations perpendicular to the engine axis.

Two lift hooks 117 and 118 (FIG. 8) are provided for lifting engine 26 into its final locked position with respect to the cradle after clamps 72, 73, 103 and 104 have engaged the engine. The hooks raise the engine a slight amount by engagement with eyes in straps 119 and 121 carried by the engine and shown partially in phantom lines in FIG. 8. The engine is raised until surfaces on the master reference machine lugs 74 and 75 of the engine block engage the accurately located undersurfaces 122 and 123 of clamps 72 and 73.

Lift hooks 117 and 118 are mounted on a pair of parallel horizontal rotatable shafts 124 and 125 mounted within the cradle. As seen in FIG. 4, the shafts extend between plates 62 and 63 of the cradle, with extensions rearwardly of plates 63 carrying gears 126 and 127 respectively. The shafts are rockable between a first position in which the hooks are in their downward or retracted position, and a second position in which hooks 117 have been rotated counterclockwise and hooks 118 clockwise (FIG. 8) to engage the engine lift straps.

The means for operating shafts 124 and 125 comprise a pair of reciprocating motors 128 and 129 mounted in tandem on the outside of cradle plate 63. Motor 128 operates a rack 131 engaging the upper portion of gear 127 while motor 129 is connected to a rack 132 engaging the underside of gear 126. As a result, when the motors are driven upwardly and to the left in FIG. 5, the shafts will be rotated so as to cause the lift hooks to engage and lift the engine, while the reverse movement will retract the hooks. Spring takeup means 133 is provided between the racks so that after the engine reference lugs have engaged surfaces 122 and 123 of the clamps, they will be held firmly in position.

In order to insure that lift hooks 117 and 118 do not permit the engine to drop inadvertently upon a loss of air pressure at motors 128 and 129, a locking member 161 is provided. This member is constantly urged by a spring 162 toward a position in which it blocks a nut 163 adjacent rack 132 from moving to the right in FIG. 5 and permitting the lift hooks to retract. Member 161 is connected to the piston of an air cylinder 164, this cylinder being connected directly to the compressed air source which supplies motors 128 and 129. As long as the latter two motors have available air, detent 161 will be held in nonobstructing relation with the rack movement, but upon a loss of pressure, the detent will be extended into blocking relation with nut 163.

The cradle also carries other equipment which is not pertinent to the present invention and is therefore not described in detail. For example, an oil pressure testing apparatus is actuated into and out of position by a reciprocating motor 134 (FIG. 8). A distribution drive mechanism 135 is provided for setting the distributor (FIGS. 5 and 11).

When engine 26 is to be cold tested, that is, driven from a source of rotary power, a hydraulic motor 136 is used (FIGS. 12 through 15). This motor, which may be of an axial piston fixed displacement swash plate construction, is mounted by a bracket 137 on forward plate 63 of cradle 45. Motor 136 is preferably a relatively small, lightweight unit driven by a larger and heavier variable displacement hydraulic pump indicated in dot-dash lines at 138 in FIG. 2 which rests on the floor alongside test stand 21. The hydrostatic system comprising motor 136 and pump 138 is a closed hydraulic loop, open control loop system with fixed mechanical stops on the variable displacement pump to permit repetitive accuracy at selected test speed settings. Alternatively, repetitive accuracy may be achieved without fixed stops by a closed control loop system.

With a closed control loop arrangement, engine 26 may be hot-tested using hydraulic motor 136 as a pump and pump 138 as a motor. The displacement of hydraulic unit 138 would be varied to simulate different load or inertia conditions imposed on the engine being tested, such as uphill or downhill conditions.

An output shaft 139 of motor 136 is coaxial with the engine crankshaft. the hub and associated sheaves of which are indicated in dot-dash lines at 140 in FIG. 12.

A sleeve 141 is fixedly keyed to shaft 138 and carries an elastomer coupling generally indicated at 142. This coupling is slidably mounted on the sleeve and connected thereto by a key 143. The coupling has a metallic inner member 144, a metallic outer member 145, and an elastomer intermediate element 146, elements 144, 145 and 146 being bonded together. The elastomer element, for example, may be of 60 durometer urethane, allowing approximately 0.010 inch to 0.015 inch misalignment. This member also serves as an isolation damper, dynamically uncoupling the driven member 145 from the other parts and serves to further reduce the ratio of parasitic weight to weight of the engine.

The outer end of member 145 has a conical surface 147 for centering purposes with respect to the crankshaft hub. A pair of driving lugs 148 (FIG. 14) extend from surface 146 and are receivable by a pair of slots indicated in dot-dash lines at 149 (FIG. 12) on the crankshaft hub. Coupling 141 is urged to its crankshaft engaging position by a helical coil compression spring 150 disposed between the outer end of coupling 142 and shaft 139. A toothed member 151 is mounted on member 145, and a sensor 152 adjacent this member is used to measure rotational speed.

Means are provided for retracting coupling 142, this means comprising a reciprocable motor 153 (FIG. 14) which operates a forked lever 154 pivoted at 155 to coupling housing 156. The jaws 157 (FIG. 15) of lever 154 carry roller bearings 158 which are on opposite sides on member 145. When motor 153 is extended upwardly from its FIG. 15 position, rollers 158 will engage gear 151 to retract the sleeve to its dot-dash line position shown partially in FIG. 12.

In operation, assuming an initial condition in which an engine 26 has arrived opposite test stand 21, elevator 27 will raise the engine and its pallet away from conveyor 24, and diverter 29 will pull the engine and pallet to a position within the cradle. At this time the cradle will be captured within frame 33 by extended members 49. The cradle will therefore have an exact alignment with respect to frame 33.

Safety doors 55 and 56 having been closed, engine claims 72 and 73 will be advanced to engage engine 26, the rear clamp 73 forcing the engine against forward stop 69. The engine will be laterally positioned by these clamps as well as by clamps 103 and 104 which advance together with clamps 72.

Lift hooks 117 and 118 will then be actuated to raise the engine, accurately locating the engine by means of stop surfaces 122 and 123 on clamps 72 and 73. In effect, therefore, the engine will be solidly secured to the cradle in fore and aft, lateral and vertical directions. Elevator 31 will lower pallet 25 sufficiently to permit transducer probes 105 and 106 to be advanced until they engage the engine.

At this time rotary crankshaft driving motor 136 will be connected to crankshaft 140 by actuation of reciprocating motor 153 which permits spring 150 to move coupling 142 to the left in FIG. 12. Motor 136 will be operated at a very slow or creep speed until lugs 148 of coupling 142 engage notches 149 on the crankshaft hub, and will then drive the engine at idle speed. Oil pressure will be monitored and the distributor adjusting mechanism engaged with the engine. The amplitude of transducer movement may be monitored at this slow speed to determine whether there is excessive noise.

With the cradle still locked to the frame, the engine will then be driven at relatively high speed (e.g., 1,800 rpm) by motor 136. The cradle will then be unclamped by retracting locking pins 49. The dynamic unbalance of the engine will be measured by the seismic sensors selectively tuned to the specific rpm frequency, by determining the amount and angular location of the engine movement with respect to TDC. The seismic transducers will also be monitored throughout the frequency range at this speed for noise.

The dual pivotal support for cradle 45 will enable the dynamic unbalance measurements to be made in an accurate and consistent manner. The presence of this pivotal means in effect uncouples the cradle and engine from the framework. The axis of vertical pivot 46 preferably passes through the center of gravity of the engine, and the axis of horizontal pivot 47 may be parallel to the crankshaft axis.

It is a requirement that engine 26 be rotated at a speed high enough to assure dynamic motion. The suspension comprising the engine and cradle will have two natural frequencies. As rotation is started and increased in speed, the engine and cradle will move together in a direction perpendicular to the axis of rotation of the crankshaft if there is static unbalance in the engine. In this case the rotation would be about horizontal pivot or bearing 47 and the seismic transducers will be in phase, with both moving back and forth in unison. When speed is increased beyond this point and dynamic unbalance is present in the engine, the engine and cradle will start to pivot about the center of gravity of the system, that is, about vertical pivot or bearing 46, with the seismic transducers measuring the amplitude of this motion by movement which is 180° out of phase.

Various other measurements and tests will be carried out which are not pertinent to the present invention while the engine is being driven at high speed. For example, the high speed timing groove may be checked with and without vacuum and the oil pressure also checked.

Cradle 45 will then be reclamped to the frame by locking pins 49 and the rotational speed of the crankshaft reduced to zero by motor 136. Transducers 105 and 106 will be withdrawn, pallet 25 raised and various other appurtances such as the TDC sensor, oil pressure pickup means and distributor mechanism disengaged. Coupling 142 will also be retracted by actuation of reciprocating motor 153. Lift hooks 117 and 118 will be lowered by motors 128 and 129 and engine clamps 72, 73, 103 and 104 withdrawn by motors 76, 77, 78 and 79. Doors 55 and 56 will be opened and the engine and pallet returned to the main conveyor line by diverter 29.

We claim:

1. In a test stand for vehicle engines, an open frame, a cradle of inverted U shape within said frame, means suspending said cradle from the top of said frame for free movement on a plurality of axes with respect thereto, means rigidly locating and clamping an engine to be tested in an accurate position within said cradle, and means sensing the movement of said clamped engine when its crankshaft is rotated.

2. The combination according to claim 1, further provided with means selectively locking said cradle in an accurate position with respect to said frame.

3. The combination according to claim 1, further provided with a motor carried by said cradle and engageable with the engine crankshaft for rotation thereof.

4. The combination according to claim 3, further provided with a coupling between said motor and engine, said coupling including means dynamically isolating said motor from said crankshaft.

5. The combination according to claim 4, said coupling providing inner and outer sleeves and an elastomer element between said sleeves and bonded thereto.

6. The combination according to claim 1, said frame being adjacent a conveyor carrying pallet-supported engines past the frame, diverting means actuatable to withdraw an individual engine and pallet from the conveyor into said frame and cradle, and an elevator beneath said cradle, said elevator being retractable downwardly to lower the pallet after the engine has been clamped in the cradle.

7. The combination according to claim 1, said clamping means comprising two pairs of horizontally slidable members carried by said cradle on opposite sides of the engine and engageable with reference surfaces thereof, motors carried by said cradle for actuating said slides, a locating stop at the forward end of said cradle, and means on one of said slides responsive to advancing movement thereof to urge said engine against said stop.

8. The combination according to claim 7, further provided with vertical shafts rotatably supported in said cradle and connecting said motors to said slot by rack-and-pinion means.

9. The combination according to claim 7, further provided with a third pair of slides below said first slides and actuatable simultaneously with one pair of said first slides.

10. The combination according to claim 9, said sensing means comprising a pair of probes horizontally slidable on said cradle opposite said third pair of slides, said probes and third pair of slides being aligned with the crankshaft axis.

11. The combination according to claim 1, said suspension means comprising a vertical bearing and a horizontal bearing.

12. The combination according to claim 11, said horizontal bearing being perpendicular to the engine crankshaft.

13. The combination according to claim 1, said engine locating means comprising lift hooks movably mounted on said cradle and engageable with opposite sides of said engine, and means for actuating said lift hooks between retracted positions and advanced positions in which said engine is held against said engine clamping means.

14. The combination according to claim 13, said lift hooks being mounted on a pair of parallel shafts rotatably mounted in said cradle, and motor means on said cradle for simultaneously rotating said shafts.

15. The combination according to claim 13, said engine clamping means comprising a plurality of slides carried by said cradle on opposite sides of said engine and movable into engagement therewith.

16. The combination according to claim 15, said cradle being further provided with a stop at its forward end for limiting movement of said engine, at least one of said slides having a cam surface for urging said engine against said stop.

17. The combination according to claim 13, said lift hook actuating means being air-operated, and means responsive to a loss of available air pressure for said actuating means after the lift hooks have been advanced to lock the lift hooks in their advanced positions.

18. The combination according to claim 17, said lift hook actuating means comprising reciprocable racks, said locking means comprising a detent spring-urged into obstructing relation with lift-hook-retracting movement of said racks, and a piston and cylinder holding said detent in a rectracted position.

19. The combination according to claim 1, said cradle comprising forward and rear vertical plates and horizontal plates therebetween, said plates being constructed of a light weight metal.

20. The combination according to claim 19, said frame comprising four posts with horizontal members connecting the upper ends thereof, said cradle being suspended from said upper frame members.

21. The combination according to claim 1, said engine clamping means comprising slides mounted on said cradle, one of said slides carrying means for sensing the top dead center position of said engine.

22. The combination according to claim 1, further provided with a hydrostatic system comprising a fixed displacement motor carried by said cradle and a variable displacement pump spaced from said cradle, said motor and pump comprising a closed hydraulic loop hydrostatic system.

23. The combination according to claim 22, said system being of the open control loop type with fixed mechanical stops on the variable displacement pump.

24. The combination according to claim 22, said system being of the closed control loop type, whereby the engine may be hottested by using said motor as a pump and said pump as a motor.

25. In a test stand for vehicle engines, an open frame, a cradle of inverted U shape suspended from the top of said frame for free pivotal movement on two axes, a plurality of locking pins selectively engageable with said cradle to rigidly secure it to said frame in a fixed location, means for transporting a vehicle engine to be tested into said cradle in the direction of the crankshaft axis against a fixed stop on the cradle, a plurality of slidable members on said cradle engageable with reference surfaces on opposite sides of said engine to accurately locate the engine with respect to the cradle in a direction transverse to the crankshaft axis, a plurality of lifting members movably mounted on said cradle and engageable with portions of the engine to lift the engine into an accurate vertical position with respect to the cradle, a light weight rotatable motor attached to one end of said cradle, coupling means selectively connectible between the output of said motor and the crankshaft of said engine, said coupling means having an isolation damper for minimizing the amount of dynamic unbalance by the motor during rotation, and a pair of seismic transducers mounted on the forward and rear portions of said cradle for measuring engine vibration.

* * * * *